US008434150B2

(12) United States Patent
Xie et al.

(10) Patent No.: US 8,434,150 B2
(45) Date of Patent: Apr. 30, 2013

(54) USING SOCIAL GRAPHS TO COMBAT MALICIOUS ATTACKS

(75) Inventors: Yinglian Xie, Cupertino, CA (US); Fang Yu, Sunnyvale, CA (US); Martin Abadi, Palo Alto, CA (US); Eliot C. Gillum, Mountain View, CA (US); Junxian Huang, Ann Arbor, MI (US); Zhuoqing Morley Mao, Ann Arbor, MI (US); Jason D. Walter, San Jose, CA (US); Krishna Vitaldevara, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 197 days.

(21) Appl. No.: 13/070,497

(22) Filed: Mar. 24, 2011

(65) Prior Publication Data

US 2012/0246720 A1     Sep. 27, 2012

(51) Int. Cl.
*H04L 29/06*     (2006.01)

(52) U.S. Cl.
USPC ...... 726/22; 726/4; 726/14; 726/18; 713/154; 709/206

(58) Field of Classification Search .................. 713/154; 709/206; 726/4, 14, 18, 22
See application file for complete search history.

(56) References Cited

U.S. PATENT DOCUMENTS

| | | |
|---|---|---|
| 7,155,738 B2 | 12/2006 | Zhu et al. |
| 7,707,122 B2 | 4/2010 | Hull et al. |
| 2010/0095374 A1 | 4/2010 | Gillum et al. |

OTHER PUBLICATIONS

Jeng-Haur Wang, "Social Network Analysis for E-mail Filtering", 2006, pp. 1-10, http://www.im.cpu.edu.tw/cyber06/cyber06-a6.pdf.*

Mojdeh, et al., "Semi-Supervised Spam Filtering using Aggressive Consistency Learning", Retrieved at <<http://59.108.48.12/proceedings/sigir/sigir2010/docs/p751.pdf>>, Jul. 19-23, 2010, pp. 751-752.

Gomes, et al., "Comparative Graph Theoretical Characterization of Networks of Spam and Legitimate Email", Retrieved at <<http://www.ceas.cc/2005/papers/131.pdf>>, Apr. 4, 2005, pp. 8.

Donnell, et al., "Using Email Social Network Analysis for Detecting Unauthorized Accounts", Retrieved at <<http://www.mawode.com/~waltman/pubs/CEAS06-ODonnell.pdf>>, Jul. 27-28, 2006, pp. 5.

Boykin, et al., "Personal Email Networks: An Effective Anti-Spam Tool", Retrieved at <<http://arxiv.org/PS_cache/cond-mat/pdf/0402/0402143v1.pdf>>, Feb. 3, 2004, pp. 10.

Zhuang, et al., "Characterizing Botnets from Email Spam Records", Retrieved at <<http://www.usenix.org/event/leet08/tech/full_papers/zhuang/zhuang_html/>>, Oct. 21, 2010, pp. 23.

(Continued)

*Primary Examiner* — Brandon Hoffman
*Assistant Examiner* — Hee Song
(74) *Attorney, Agent, or Firm* — Microsoft Corporation (57) ABSTRACT

Detection of user accounts associated with spammer attacks may be performed by constructing a social graph of email users. Biggest connected components (BCC) of the social graph may be used to identify legitimate user accounts, as the majority of the users in the biggest connected components are legitimate users. BCC users may be used to identify more legitimate users. Using degree-based detection techniques and PageRank based detection techniques, the hijacked user accounts and spammer user accounts may be identified. The users' email sending and receiving behaviors may also be examined, and the subgraph structure may be used to detect stealthy attackers. From the social graph analysis, legitimate user accounts, malicious user accounts, and compromised user accounts can be identified.

20 Claims, 5 Drawing Sheets

OTHER PUBLICATIONS

"Graph Structures and Web Spam Detection", filed on Mar. 5, 2007, pp. 9.
"Graph Based Bot-User Detection", filed on Oct. 10, 2008. pp. 48.
Danchev, Dancho, "Inside India's CAPTCHA solving economy", Retrieved at <<http://blogs.zdnet.com/security/?p=1835>>, Aug. 29, 2008, pp. 6.
Schneier, Bruce, "Schneier on Security: Spammers Using Porn to Break Captchas", Retrieved at <<http://www.schneier.com/blog/archives/2007/11/spammers_using.html>>, Nov. 1, 2007, pp. 7.
"Sending limits", Retrieved at <<http://mail.google.com/support/bin/answer.py?hl=en&answer=22839>>, 2011, p. 1.
Ahn, et al., "Analysis of Topological Characteristics of Huge Online Social Networking Services", Retrieved at <<http://www2007.org/papers/paper676.pdf>>, May 8-12, 2007, pp. 835-844.
Chirita, et al., "MailRank: Global Attack-resistant Whitelists for Spam Detection", Retrieved at <<http://citeseerx.ist.psu.edu/viewdoc/download;jsessionid=7A02B88EC2BC5FF19838C0E667607A56?doi=10.1.1.59.1556&rep=rep1&type=pdf>>, Proceedings of the 14th ACM international conference on Information and knowledge management, 2005, pp. 8.
Bonato, et al., "A Geometric Model for On-line Social Networks", Retrieved at <<http://www.usenix.org/event/wosn10/tech/full_papers/Bonato.pdf>>, In Proceedings of the 3rd Workshop on Online Social Networks, Jun. 2010, pp. 1-7.
Brin, et al., "The Anatomy of a Large-scale Hypertextual Web Search Engine", Retrieved at <<http://citeseerx.ist.psu.edu/viewdoc/download?doi=10.1.1.96.2493&rep=rep1&type=pdf>>,1998, pp. 26.
Danezis, et al., "Sybilnfer: Detecting Sybil Nodes using Social Networks", Retrieved at <<http://citeseerx.ist.psu.edu/viewdoc/download?doi=10.1.1.149.6318&rep=rep1&type=pdf>>, Jan. 12, 2009, pp. 15.
Duda, et al., "Pattern Classification", Retrieved at <<http://edlab-www.cs.umass.edu/cs589/2005-lectures/duda-hart-stork-chapter2.pdf>>, 2000, pp. 38.
Garriss, et al., "RE: Reliable Email", Retrieved at <<http://www.usenix.org/event/nsdi06/tech/full_papers/garriss/garriss.pdf>>, NSDI '06: 3rd Symposium on Networked Systems Design & Implementation, 2006, pp. 297-310.
Hao, et al., "Detecting Spammers with SNARE: Spatio-temporal Network-level Automatic Reputation Engine", Retrieved at <<http://www.cc.gatech.edu/~feamster/papers/snare-usenix09.pdf>>, USENIX Security Symposium, 2009, pp. 17.
Kleinberg, Jon, "The Small-world Phenomenon: An Algorithmic Perspective", Retrieved at <<http://citeseerx.ist.psu.edu/viewdoc/download?doi=10.1.1.117.7097&rep=rep1&type=pdf>>, Oct. 1999, pp. 1-14.

Leskovec, et al., "Graphs over Time: Densification Laws, Shrinking Diameters and Possible Explanations", Retrieved at<<http://citeseerx.ist.psu.edu/viewdoc/download?doi=10.1.1.62.357&rep=rep1&type=pdf>>, Aug. 21-24, 2005, pp. 11.
Mislove, et al., "Measurement and Analysis of Online Social Networks", Retrieved at <<http://citeseerx.ist.psu.edu/viewdoc/download;jsessionid=9C2D9ACD4610ABF23C5BA9DD83852455?doi=10.1.1.109.4432&rep=rep1&type=pdf>>, Oct. 24-26, 2007, pp. 14.
Boykin, et al., "Leveraging Social Networks to Fight Spam", Retrieved at <<http://citeseerx.ist.psu.edu/viewdoc/download?doi=10.1.1.88.8532&rep=rep1&type=pdf>>, Apr. 2005, pp. 61-68.
Qian, et al., "On Network-level Clusters for Spam Detection", Retrieved at <<http://www.eecs.umich.edu/~zhiyunq/pub/ndss10_spam-IP-clusters.pdf>>, Feb. 2010, pp. 17.
Sarma, et al., "A Sketch-based Distance Oracle for Web-scale Graphs", Retrieved at <<http://citeseerx.ist.psu.edu/viewdoc/download?doi=10.1.1.167.9222&rep=rep1&type=pdf>>, Feb. 4-6, 2010, pp. 10.
Tran, et al., "Sybil-resilient Online Content Voting", Retrieved at <<http://www.usenix.org/event/nsdi09/tech/full_papers/tran/tran.pdf>>, 2009, pp. 15-28.
Viswanath, et al., "An Analysis of Social Network-based Sybil Defenses", Retrieved at <<http://www.mpi-sws.org/~gummadi/papers/comm318g.pdf>>, Aug. 30-Sep. 3, 2010, pp. 12.
Wilson, et al., "User Interactions in Social Networks and their Implications", Retrieved at <<http://www.cs.ucsb.edu/~alessandra/papers/interaction-eurosys09.pdf>>, Apr. 1-3, 2009, pp. 14.
Xie, et al., "Spamming Botnets: Signatures and Characteristics", Retrieved at <<http://ccr.sigcomm.org/drupal/files/p171-xie.pdf>>, Aug. 17-22, 2008, pp. 171-182.
Yu, et al., "SybilLimit: A Near-optimal Social Network Defense against Sybil Attacks", Retrieved at <<http://citeseerx.ist.psu.edu/viewdoc/download?doi=10.1.1.150.5536&rep=rep1&type=pdf>>, 2010, pp. 31.
Yu, et al., "SybilGuard: Defending against Sybil Attacks via Social Networks", Retrieved at <<http://www.math.cmu.edu/~adf/research/SybilGuard.pdf>>, Sep. 11-15, 2006, pp. 267-278.
Yu, et al., "DryadLINQ: A System for General-purpose Distributed Data-parallel Computing using a High-level Language", Retrieved at <<http://research.microsoft.com/pubs/70861/DryadLINQ-osdi.pdf>>, 2008, pp. 14.
Zhao, et al., "BotGraph: Large Scale Spamming Botnet Detection", Retrieved at <<http://citeseerx.ist.psu.edu/viewdoc/download?doi=10.1.1.148.9847&rep=rep1&type=pdf>, 2009, pp. 321-334.

* cited by examiner

USING SOCIAL GRAPHS TO COMBAT MALICIOUS ATTACKS

BACKGROUND

To prevent email spam and other malicious activities, email providers have attempted to identify attackers based on abnormal signatures associated with their activities. However, as the attackers evolved and changed their strategies, the abnormal signatures changed as well, making it more difficult for email providers to detect the activities.

Other defenses include reputation systems that assign a reputation score to each of the users based on a set of rules that examine an individual user's email communication patterns. However, the set of rules for detecting attackers are not robust and attackers can easily game the system once they learn the rules. Yet another is a geolocation-based defense system, which marks a user as suspicious if the user logins are from disparate geographic locations. However, geolocation-based systems can be defeated by changing the login pattern of user accounts under control of attackers.

SUMMARY

Disclosed herein are methods and systems providing techniques to identify legitimate users of services, such as email, chat, social media sites and the like. Knowledge of legitimate users may be used by service providers in several ways. For example, service providers do not have to trade off usability for security after having identified the legitimate users. As such, they can devote more resources and quality of service guarantees to legitimate users so that their normal activities are not impaired by attackers. Protecting legitimate users is a robust approach to defend against ever-changing attacks. The service providers may combat attacks knowing that the set of legitimate users is relatively stable and has common patterns that do not change significantly. Service providers can aid in the detection of malicious users by identifying legitimate users and their associated user signatures and profiles. This information may be used in a complementary fashion with attacker detection based approaches.

In some implementations, a core set of trusted users is identified by determining connected components of user friendship graphs, and all users on the biggest connected component are identified. The core set of trusted users may be used to identify more legitimate users by looking at their communication to the set of trusted users, e.g., email communications. Graph features of the identified legitimate users are derived to detect hijacked users and malicious users. For example, PageRank and degree-based detection techniques may be used to detect spammer email accounts.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, these embodiments are not limited to the specific methods and instrumentalities disclosed. In the drawings.

DETAILED DESCRIPTION

The present disclosure describes systems and methods for both identifying legitimate users and detecting hijacked and attacker email accounts, such as those used by spammers. A social graph may be constructed of email users, and biggest connected components (BCC) of the graph are identified to recognize legitimate users. Further, a degree-based algorithm and a PageRank-based detection algorithm may be applied to the social graph to identify the attackers' email accounts. In addition, the users' email sending and receiving behaviors are analyzed, and techniques like subgraph structures are applied to detect stealthy attackers.

Figure 1:
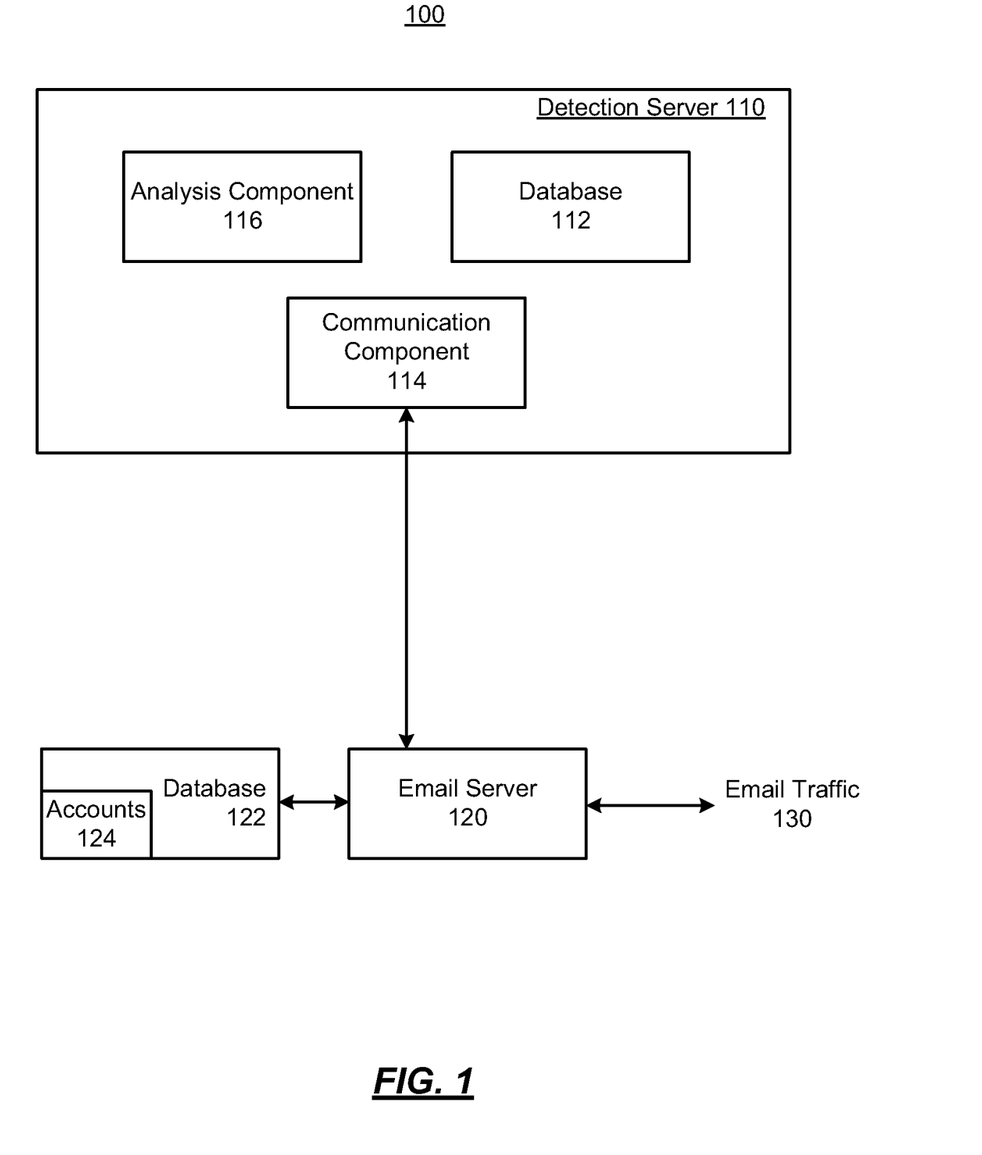
FIG. 1 illustrates an exemplary networked computing email account management system in which processes of the present disclosure may be implemented.

Referring to FIG. 1, there is illustrated an exemplary networked computing email account management system 100 in which processes of the present disclosure may be implemented. The email account management system 100 may include one or more detection servers, shown as detection server 110, and one or more email servers, shown as email server 120. FIG. 1 shows only one detection server 110 and one email server 120 for purpose of clarity and should not be construed to limit the present disclosure to implementations having only one detection server 110 and one email server 120.

The email server 120 may send and receive emails, monitor and log email traffic 130 for one or more email accounts 124, and may generate reports that are sent to the detection server 110. The email server 120 may run on a separate computer from the detection server 110, or on the same computer. The email server 120 may also include a database 122, which stores information about email that passes through the email server 120 and information about the one or more email accounts 124.

The email server 120 may process emails and logged information about the emails in the database 122, including, but not limited to, the sending email account, the recipient email accounts, the number of recipients, the number of attachments, if any, the time and date of the email, the size in bytes of the email body, the size in bytes of the subject line, the number and list of "keywords" in the email subject line or body, other linguistic features of the email content (e.g., the number of nouns or noun phrases, the frequency distribution of words, the frequency distribution of n-grams, and/or other such linguistic features commonly known in the art), as well as other recorded properties of the email (some that may be inferred by application of a probabilistic, statistical, or classification model which may label the email with some category of interest).

The detection server 110 may run at a central location and may include a database 112, a communication component 114, and an analysis component 116. The communication component 114 receives and sends information to and from the email server 120. Information about the email traffic 130 may be transmitted to one or more detection servers 110 from the email server 120, and vice versa, such that each email server 120 in the email account management system 100 is aware of any findings by the detection server 110.

The analysis component 116 analyzes email traffic 130 and account activity and may identify various types of spamming attacks launched from email accounts. Such attacks include, but are not limited to, a simple attack, a colluded attack without hijacked accounts, and a colluded attack with hijacked accounts. Simple attacks are those where a malicious email account is created by attackers that is used to send out spam emails without the help of other malicious email accounts. A collusive attack without hijacked accounts comprises a group of accounts created by attackers, i.e., non-hijacked accounts that are used for spamming and colluding among themselves. The colluded attack with hijacked accounts comprises a group of malicious accounts, which may be either created by attackers or hijacked accounts that are used for spamming and colluding among themselves.

To detect the attacks, in some implementations, the analysis component 116 may construct two graphs: an email-communication graph (a directed graph) and a user friendship graph (an undirected graph). On both graphs, each node corresponds to an email user represented by a unique email address. Edges on both graphs may be weighted. For the directed communication graph ($G_d$), an edge $e_d(v_1; v_2) \in E_d$ with weight w means user $v_1$ has sent w emails to $v_2$ during the data collection period. An edge $e_u(v_1; v_2) \in E_u$ on the undirected friendship graph ($G_u$) means $v_1$ and $v_2$ have mutually sent at least two emails to each other. Its weight may be defined as $w(e_u) = \min(n(v_1; v_2); n(v_2; v_1))$, where $n(v_1; v_2)$ represents the number of emails sent from $v_1$ to $v_2$.

The analysis component 116 may use the user friendship (undirected) graph to identify good (i.e., legitimate) users, as the majority of the users in the biggest connected components are legitimate users. The email communication graph may be used to detect spammer accounts using degree-based detection techniques and PageRank-based detection techniques. In graph theory, a "connected component" of an undirected graph is a subgraph in which any two nodes (vertices) are connected to each other by paths, and which is connected to no additional vertices. The BCC of a graph is the largest subgraph where all nodes in the subgraph are reachable by all other nodes in the subgraph. As such, the BCC can be used to rapidly identify and expand a core set of good and active users using the directed graph (i.e., the users to which the good users in the BCC communicate). Optionally or additionally, the users' email sending and receiving behaviors may be compared, and subgraph structures may be used to detect stealthy attackers. Further details of the techniques implemented by the analysis component 116 are described below in FIGS. 2-4.

The detection server 110 may be operated by a trusted third party, an email service provider, a social network service provider, a corporate network, etc., to propagate a list of known "bad" (i.e., malicious) email accounts to the email servers. This propagation may be automated for rapid update of the email servers. The detection server 110 may aggregate statistics obtained from the email servers which allows the email account management system 100 to monitor email flows at a global level.

Figure 2:
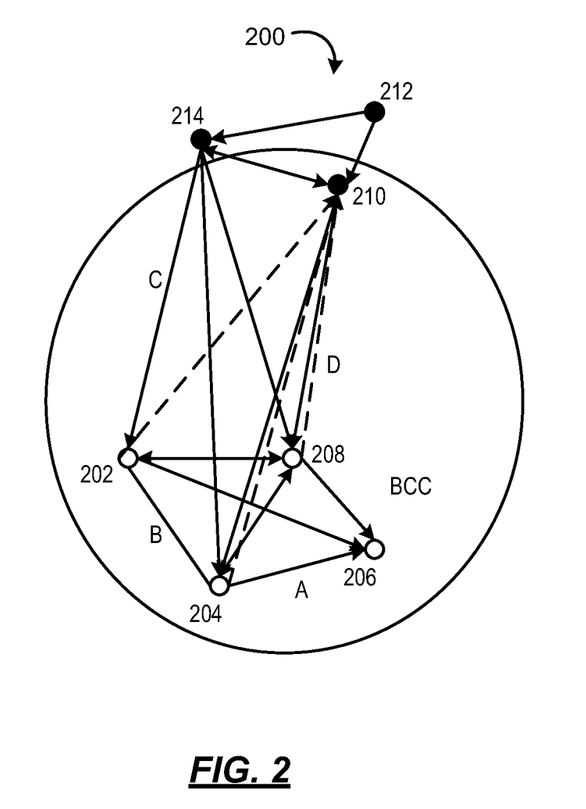
FIG. 2 illustrates an exemplary social graph associated with an email system.

FIG. 2 illustrates an exemplary social graph 200 associated with an email system. Each node 202, 204, 206, 208, 210, 212, and 214 of the social graph 200 may be an account uniquely defined by, e.g., an email address. Each directed edge of the social graph is determined from recipients of emails sent from the account or from senders of emails to the account. For example, if Alice sends emails to Bob, an edge (A) pointing from the node associated with Alice (i.e., node 204) to the node associated with Bob (i.e., node 206) is added in the social graph. The direction of the edge represents the flow of emails. In some implementations, each edge may also be assigned a weight indicating how trustworthy this edge is. The edge weight may be determined by various factors, including a number of emails, whether any emails have been marked as spam, a time span between emails sent to the recipient, etc. Undirected edges, such as B, exist if a sender and recipient both send emails to each other. For example, if Alice (node 204) and Harry (node 202) both send emails to each other and there are two directed edges between them, then the undirected edge B between them represents a friendship. In some implementations where weights are used as noted above, as multiple emails in each direction may be required for a friendship.

Several conclusions may be drawn from the social graph 200. For example, legitimate (also referred to as "good") users typically receive emails from other good users. Such communication is shown by the circle of good users in the BCC to which nodes 202, 204, 206, and 208 belong. Malicious (also referred to as "bad") users may communicate with good users, but their communication is typically directed to the good users without a reply. As such, edges associated with bad users are typically directional (e.g., edge C). Emails sent to bad users from good users are suspicious (e.g., edge D), as this is usually an error on the part of the good user. Also, it is generally difficult for bad users to enter good users' communities.

As noted above, good users are typically found in the BCC. Although there could be other connected components separate from this one in the graph (not shown), their size would be much smaller. For example, if two users only email each other and do not communicate with any other users, there is a connection between them and these two users form a small connected component of size two. Therefore, the graph may contain different connected components of varying weights. With the knowledge of legitimate user set on BCC, the analysis component 116 may proceed to identify additional legitimate users in a process using the email-communication (directed) graph and the following observation: legitimate users usually send emails to other legitimate users, not to spammers. So the directed email-communication graph can be used to identify the email recipients of BCC users and define them as also legitimate users. Essentially in this process, the legitimacy of BCC users "vouches" for the legitimacy of their email recipients.

During the legitimate user expansion process, two heuristics may be applied to avoid mistakenly including malicious accounts in the expanded legitimate user set. For example, for a user to be included, she may be required to first receive a number of emails from multiple BCC users. A legitimate user may have accidentally replied to a spam email, thus by requiring a user to receive emails from multiple BCC users, the possibility of including spammer accounts in the expanded legitimate user set is reduced. In another example, all the BCC users that have degree larger than a preset threshold $\mu$ (=5000, for example) may be removed before the expansion process is performed. Such users include active, large email lists that do not correspond to real human users. Using the later heuristic reduces the chance of a spammer account being included because it triggers auto-reply type messages from large email lists or subscribe to these large email lists.

In practice, the implicit "vouching" process described above may be used to determine the legitimacy of new users. Many service providers today ask a new user to perform CAPTCHA tests for every 20-30 emails they send or limit their daily maximum number of messages. The implicit "vouching" process can potentially replace CAPTCHA so that legitimate new users are recognized earlier. Further, this strategy can defend against attackers who redirect CAPTCHA to cheap laborers.

In addition, the communications from authoritative entities may be used to vouch for legitimate new users. For example, receiving an order confirmation email from Amazon.com may indicate the user is likely a legitimate user.

Figure 3:
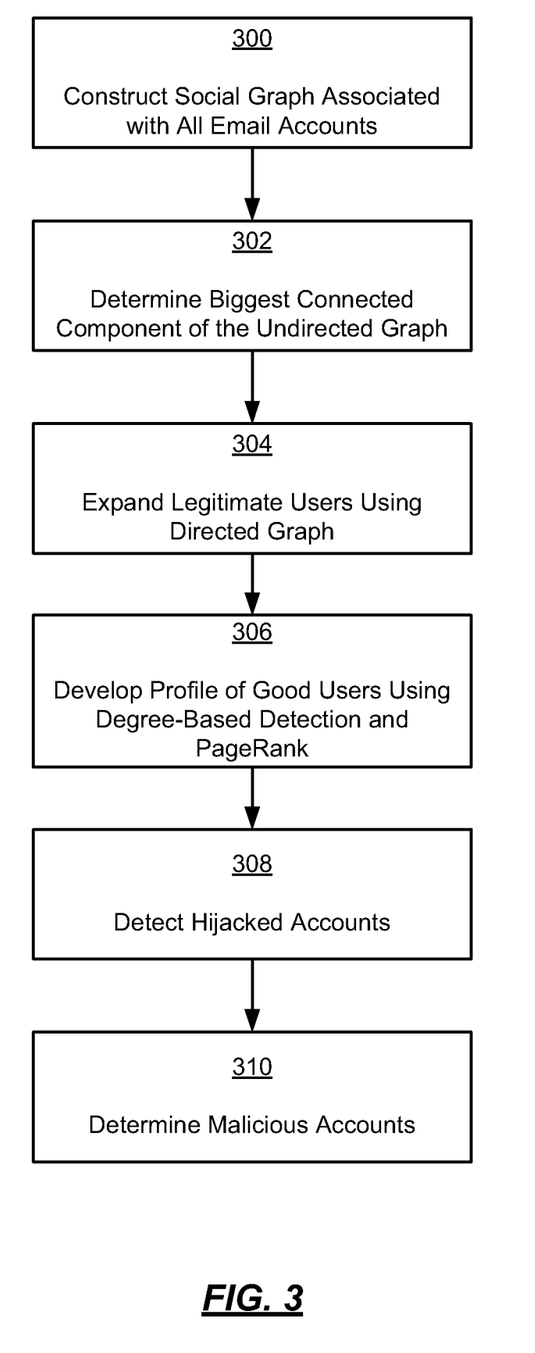
FIG. 3 illustrates an operational flow diagram of exemplary processes that are performed to identify attacker email accounts.

FIG. 3 illustrates an operational flow diagram of exemplary processes that are performed to identify attacker email accounts. The operational flow of FIG. 3 may be implemented in, e.g., the analysis component 116. At 300, social graphs associated with all email accounts are constructed. For email accounts to be analyzed, the email-communication graph (directed graph) and a user friendship graph (undirected graph) may be constructed to provide a view of the connectivities associated with the email accounts.

At 302, the biggest connected component of the friendship graph (undirected graph) is determined. The analysis component 116 may analyze the email-communication graph to identify the biggest connected component of the connected components in the email-communication graph. It is likely that the biggest connection component is several orders of magnitude larger than next largest connected component. The set of users on biggest connected component likely correspond to legitimate accounts actively used by human users.

At 304, a legitimate user expansion process is performed. As described above, the analysis component 116 may expand the set of legitimate users using the email communication graph (directed graph) to identify the email recipients of set of users on the biggest connected component in the implicit vouching process.

At 306, a good user profile is determined. The analysis component 116 may use the email-communication graph (directed graph) and a user friendship graph (undirected graph) to determine a profile of good users. The profile may be developed using degree-based and PageRank based evaluations. The degree-based detection is performed based on the edges of the social graph. The degree-based detection is effective for detecting users with obvious patterns, including inactive users who only send a few emails, aggressive attackers who send many emails with few responses, and active good users who have many friends. Degree-based detection looks at an in-degree, which is a number of source users who send emails to the user; an out-degree, which is a number of destination users to whom the user sends emails; and a friend-degree, which is a number of friends of the user (represented by an undirected edge).

A directional degree-based detection is defined based on a threshold N. If the out-degree is less than or equal to N, then the user account is considered good. A bidirectional degree-based detection is defined as follows: if the out-degree is less than N for inactive users, then the account is considered good. If the out-degree is greater than N and the friend-degree/out-degree (i.e., response rate) is greater than a second threshold, K, then the account is considered good; otherwise, the account is considered bad. Bidirectional degree-based detection is based on an assumption that attackers will have a lower response rate than normal users. To select suitable thresholds N and K, a known good set and bad set of users may be selected.

PageRank may be used to assign a reputation score to the email account associated with a node on the graphs. The PageRank algorithm is widely used for ranking web pages. For web pages, PageRank utilizes a reputation value of a web page that is propagated to the web pages with an initial distribution. The PageRank computation may be iteratively repeated until a convergence point is reached. In the context of an email account (i.e., a node in the social graph 200), a reputation score is assigned to each node 202, 204, 206, 208, 210, 212, and 214 in the social graph. The score is propagated to the node's recipients/senders, at 306, described below.

In particular, let the social graph 200 be defined as follows: G=(V,E), where V is a set of nodes (email accounts) and E is a set of edges. For the PageRank algorithm with G, each node 202, 204, 206, 208, 210, 212, and 214 is initially assigned a uniform reputation score (e.g., 1.0). After the ith iteration, a node A's reputation score $R_{A,i+1}$ is given by equation (1):

$$R_{A,i+1} = 1 - d + d \sum_{\{X: e_{XA} \in E\}} \frac{R_{X,i}}{outdegree(X)} \quad (1)$$

where d is a damping factor (e.g., 0.85 or other predefined value), $R_{X,i}$ is the reputation score of node X after the previous iteration, and $\{X: e_{XA} \in E\}$ is the set of nodes in the graph having directed edges pointing to A. In some implementations, the original graph may be modified by adding an edge for each node starting and ending in itself, if this self-loop edge does not exist. This modification would have negligible impact on the overall ranking of all nodes, but provides for conservation of reputation, i.e., after each iteration, the sum of all nodes' reputation remains constant and is the same as the initial sum |V|.

This property (|V|) may be given by relationships (2)-(4):

$$\sum_{\{A \in V\}} R_{A,i+1} \quad (2)$$

$$= |V|(1-d) + d \sum_{\{A \in V\}} \sum_{\{X: e_{XA} \in E\}} \frac{R_{X,i}}{outdegree(X)} \quad (3)$$

$$= |V|(1-d) + d \sum_{\{X: \exists A \in E, s.t. e_{XA} \in E\}} \frac{R_{X,i}}{outdegree(X)} \quad (4)$$

In the above, each edge in the graph contributes to one term in the sum, so relationship (4) can be written as relationship (5):

$$= |V|(1-d) + d \sum_{\{X: \exists A \in E, s.t. e_{XA} \in E\}} R_{X,i} \quad (5)$$

Because each node is the source of at least one edge according to the self-loop modification, relationship (5) can be written as relationship (6):

$$= |V|(1-d) + d \sum_{\{X: X \in V\}} R_{X,i} = |V| \quad (6)$$

This indicates that for a group of nodes, the sum of their reputation scores will remain constant no matter how they are connected.

The PageRank based evaluation may develop a goodness score and a badness score for each node in the social graph from the reputation score. The goodness score is based on an assumption that when good users send emails to another email address, that recipient email address is highly likely to be good. As such, the goodness score may be assigned to each node and propagated to its recipients. Using PageRank, after 40 to 50 iterations for example, the ranks of the nodes will converge to determine the goodness scores for the nodes in the social graph 200. In general, the more emails a user receives from other good users, the higher its goodness score. While receiving emails from spammers or mailing lists will increase a user's goodness, the increase is limited. This is because a spammer or a mailing list may have a high goodness score (since many users send to it), so that it has a high out-degree as well. So each of its recipients will only receive a small amount of goodness during propagation. This property increases the difficulty in spoofing the email account management system 100. For example, if an attacker subscribes to mailing lists, the degree-based detection at 302 may be circumvented; however, to defeat the PageRank-based detection at 304, the attacker has to subscribe to a large number of mailing lists which is not a simple task.

In order to make the propagation more accurately reflect the real relations among different nodes, in some implementations, an edge weight may be adjusted based on communication patterns. For example, if there is strong indication that a good user is sending to a bad user (e.g., the bad user sends a large number of emails and the number of good user's emails to the bad user are few), the goodness propagated to that bad user may be adjusted to be smaller. Similarly, if there is strong indication that a user is sending to one of his friends (e.g., email communication is balanced among the two), the goodness propagated to the recipient-friend is relatively larger. In some implementations, edges may be adjusted by a weight based on an age component. Because a healthy user community normally takes time to build, a newly formed connected component of nodes may be suspicious if a majority of its edges are very recent communications.

A badness score may be determined to indicate how likely a user is bad, e.g., a spammer. The badness score may be calculated based on the inverse edges in the social graph 200. Because spammers normally send many emails, the badness propagation is defined as that from the recipients to the sender. As such, spammers would receive more badness propagation. The above is based on the assumption that if a good user sends emails to a bad account, this behavior would not be normal because a good user will typically not send to a spammer (however, sometimes, a good user may also respond to spam). Attackers may also create a group of accounts and make them send emails among themselves in an effort to defeat detection. However, using the badness score, the bad users sending emails to bad users can be detected.

In some implementations, an edge weight adjustment may be defined for badness propagation. A good user will propagate more badness to a bad user, and less to his friends who are also good users. This adjustment mitigates the problem of a good user who accidentally or for another reason responds to spam emails, because in most of these cases, spammers send out many more emails to good users rather than the opposite.

In some instances, using the individual goodness and badness scores may not separate good users from bad users. This is because some bad users may have higher goodness scores than inactive good users. As such, the badness-goodness ratio may be used as a metric to separate the good users from the bad users. Using training user sets of good and bad users, a badness-goodness ratio may be set, for example, at a threshold of 5 to separate bad users from good users. In other words, if the badness score is more than five times larger than the goodness score for an email account, the email account is bad; otherwise, it is good.

At 308, hijacked accounts are determined. The analysis component 116 may analyze one or more of the following social-graph features to determine if an email account has been hijacked. An outdegree $D(v)$ of a node v on the directed email-communication graph may be determined by the relationship $D(v)=|R(v)|$ where $R(v)$ stands for the set of email recipients of v. Since the goal of attackers is to send spam to as many recipients as possible, it is expected that hijacked users will have large outdegrees. Other features can include the PageRanks introduced earlier in the document, including the goodness scores and badness scores, and the distance of the set of email users that received email from an account.

In view of the above, for normal users, the outdegree $D(v)$ follows a Poisson distribution, and the average distance $I(v)$ follows normal distribution. However, for hijacked users, the outdegree distribution has heavy tail and the average distance will be large. Thus, hijacked email accounts may be identified based on the features noted above.

At 310, malicious accounts may be determined based on the developed good user profile. For example, accounts that deviate from the profile may be identified by the analysis component 116 as malicious user accounts or hijacked user accounts and appropriate actions taken.

Thus, the operational flow of FIG. 3 may be used to separate good email accounts from bad email accounts associated with attackers who send spam or other malicious content, and hijacked email accounts that are associated with legitimate users but compromised by attackers.

Figure 4:
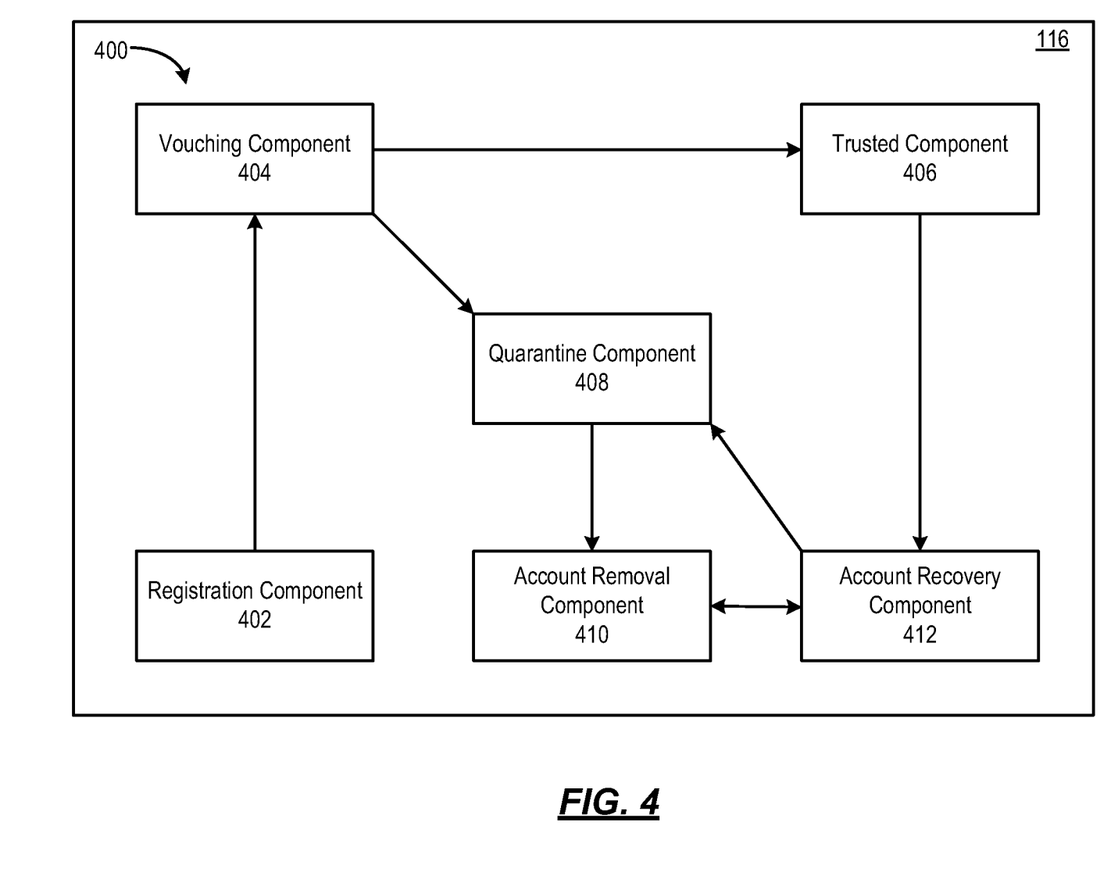
FIG. 4 illustrates an exemplary account management framework, which may be implemented in the email account management system of FIG. 1.

FIG. 4 illustrates an exemplary account management framework 400, which may be implemented in the email account management system 100 of FIG. 1 and may implement the operational flow of FIG. 3. As illustrated in FIG. 4, the account management framework 400 may be implemented in the analysis component 116, and may include a registration component 402, a vouching component 404, a trusted component 406, a quarantine component 408, an account removal component 410, and an account recovery component 412.

The registration component 402 serves to register new user email accounts. Users enter information and may be asked to pass a reverse Turing test, such as CAPTCHA. Turing tests are tests of a machine's ability to demonstrate human intelligence. CAPTCHA is a particular variant that protects websites against bots by generating and grading optical character recognition tests that humans can pass, but current computer programs cannot. For example, humans can read distorted text displayed in a verification window, but current computer programs cannot.

Newly created accounts are placed into the vouching component 404, which implements a vouching process that uses various channels to validate user identity, such as that described with respect to FIG. 3. If the new account completes the vouching process, it is placed into the trusted component 406. Otherwise, it is placed into the quarantine component 408.

In both the trusted component 406 and quarantine component 408, a method such as the method of FIG. 3 may be implemented to monitor and detect abnormal behaviors associated with the email accounts. For accounts that are known to be malicious and are not recoverable, they will be put into the removal component 410 and may be removed. If suspicious activity is identified in what was believed to be good accounts, then additional actions may be performed to help users recover their accounts in the recovery component 412. A more detailed description of each component follows.

The registration component 402 may be implemented in a similar fashion as existing social applications, in which users are asked to enter information into the system and pass a reverse Turing test. Because such tests can be defeated, the account management framework 400 operates under the assumption that attackers will pass this registration component 402. As such, the vouching component 404 is provided to offer a newly registered user options to "vouch" for the account. The vouching component 404 provides for stronger authentication and to make it difficult for the attackers to create fake identities. For example, vouching options may include, but are not limited to, binding the newly registered email account with a mobile telephone number, a credit card, or a home address, etc.

In some implementations, the vouching component 404 may use social connectivity information to verify the user identify, as described above with regard to FIG. 3. Implicit vouching and explicit vouching options may be provided. With implicit vouching, a new user may be required to receive emails from a sufficient number of senders before the user obtains the privilege to send emails. In the evaluation process, the vouching component 404 will check the connectivity among the list of users and each individual account's reputation, whether the user is on BCC, and lifetime, etc. Qualified accounts (nodes) in the social graph may be selected as vouchers, based upon which the vouching component 404 will decide whether to trust the new account. If not, the new account will be put into the quarantine component 408.

In some implementations, the newly registered email account may be immediately able to send a limited number of emails. These email accounts may send emails before receiving any from the BCC senders. For these users, explicit vouching may be provided as an option. For example, user's contact list may be considered in constructing the social graph. In addition, external social graphs from other services (e.g., Facebook, LinkedIn) may be incorporated too. The account management framework 404 may then ask each user identified in the list whether they can confirm that the new account user is a real user. A similar evaluation process as implicit vouching may then apply (e.g., checking the connectivity among the list of users and each individual account's reputation, whether in BCC and lifetime, etc.). In yet other implementations, identified well trusted users on BCC may be used to "vouch" for more legitimate users.

In some implementations, the vouching component 404 may limit the number of times a particular email account can be used as a voucher in order to prevent attackers from using hijacked accounts. If a voucher email account is found to be hijacked, backtracking may be added into the framework 400, i.e., if the framework 400 detects that a new account passed the vouching component and later turns into a bad email account (e.g., a spamming account), all related vouchers are then marked as suspicious, along with any other new accounts that the related vouchers have vouched for.

After an email account is processed in the vouching component 404, some accounts may be put into the quarantine component 408, including most attacker-created accounts and a limited number of accounts of legitimate users. The quarantine component 408 may limit the functionality of each account placed therein. The behavior of each account may also be monitored, with the reputation of the account updated over time.

After a period of time, the account management framework 400 may move the account into the trusted component 406 or the account removal component 410. For example, an account may be quarantined until the account sends emails to, e.g., a predetermined number of destination addresses, such as 25, 50, or 100 destination addresses. While quarantined, the account can send only a small number of emails on a daily basis, which may be very inconvenient to highly actively legitimate users, but thwarts active spammers. Using the BCC, a good user account can quickly prove its legitimacy if the account receives emails from different users located in the BCC. As such, good user email accounts can pass the quarantine component 408 fairly quickly.

The following metrics may be used for making the judgment to move an account into or out of the quarantine component 408:

(1) Badness-to-goodness ratio: spammers have a significantly different ratio from legitimate users, as discussed above.

(2) Clustering coefficient of the recipient set: legitimate users tend to send emails to a defined group of users rather than a group of random users.

(3) How many BCC users sent email to this account: legitimate users have a high probability of connecting with BCC or receiving emails from BCC users over time.

(4) The features described above for hijacked user detection, e.g., graph distance between contacts.

Once the account is trusted by the system, it would be granted the intended functionality of legitimate users by the trusted component 406. A similar set of metrics as noted above may be used to detect abnormal behaviors of email accounts in the trusted component 406, as a trusted email account could be hijacked during its lifetime, or a stealthy malicious account may have passed the vouching component 404 or the quarantine component 408. If the account management framework 400 detects a significant change in the account behavior represented by the social graph based metrics described above, the email account may determine that the email account has been hijacked, and the account may be moved to account recovery component 412, such that the hijacked account can be returned to exclusive control by its rightful owner.

In the account recovery component 412, the account management framework 400 may try various ways to help the owner of hijacked account to regain control of the account, including but not limited to, contacting the cell phone number bound with the account, asking security questions created by the user during registration, etc. Once the account recovery is completed, the account may be placed into the quarantine component 408. This is performed because attackers could buy email accounts from legitimate users for spamming purposes, or the account may have been a stealthy malicious account.

However, if the account recovery is not able to complete within a time window, it would be put into account removal component 410 to prepare it for final removal. The account removal component 410 is provided to save resources that are consumed maintaining email accounts. Accounts known to be malicious with little hope of recovery may be moved into a recycle bin or removed permanently.

Thus, as described above, systems and methods are provided to determine legitimate users, malicious users, and legitimate users who have been compromised based on the social connectivity patterns of the users.

Aspects of the subject matter may be implemented in the general context of computer-executable instructions, such as program modules, being executed by a computer. Generally, program modules include routines, programs, objects, components, data structures, etc. that perform particular tasks or implement particular abstract data types. Aspects of the subject matter may also be practiced in distributed computing environments where tasks are performed by remote processing devices that are linked through a communications network. In a distributed computing environment, program modules may be located in both local and remote computer storage media, including memory storage devices.

Figure 5:
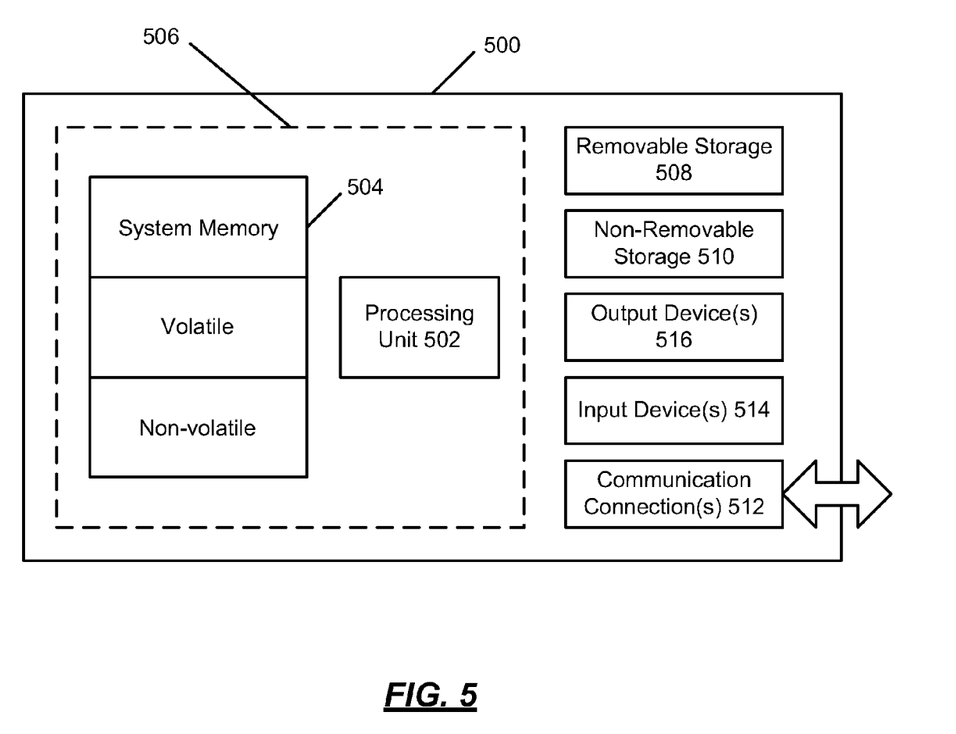
FIG. 5 shows an exemplary computing environment.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
constructing a communication graph comprising nodes representing user accounts within a provider system, and one or more directed edges, each directed edge indicative of a direction of communications sent or received between any two nodes;
constructing a friendship graph comprising nodes representing user accounts within the provider system, and one or more undirected edges, each undirected edge indicative of a pair of opposing directed edges, the undirected edges representing friendships;
determining a biggest connected component of the friendship graph, wherein the biggest connected component is a largest subgraph in which each of the nodes is reachable by each of the other nodes; and
classifying user accounts in the biggest connected component as belonging to a set of good users.

2. The method of claim 1, further comprising:
expanding the set of good users using the communication graph to create an expanded good user set; and
developing a good user profile from the set of good users and the expanded good user set.

3. The method of claim 2, further comprising:
selecting users from the set of good users as voucher accounts that are used to vouch for legitimate accounts, or using authorities or entities to vouch for legitimate accounts; and
backtracking vouching of the legitimate accounts if one of the voucher accounts is compromised such that the other legitimate accounts are marked as malicious accounts.

4. The method of claim 2, further comprising:
using the good user profile to detect hijacked user accounts and attacker-created accounts.

5. The method of claim 4, further comprising:
applying a degree-based detection to analyze an in-degree, an out-degree, and a friend-degree, wherein the in-degree represents a number of emails sent to a node, wherein the out-degree represents a number of emails sent by the node, and wherein the friend-degree represents a number of undirected edges associated with the node;

determining a ranking of the node to ascertain a reputation score that is propagated to recipient user accounts and sender user accounts associated with the node; and determining a reputation score ratio to classify the user account associated with the node as a legitimate user account, a malicious user account, or a legitimate user account that has been compromised.

6. The method of claim 5, further comprising determining the ratio as a badness-goodness ratio, wherein if a predetermined badness-goodness ratio threshold is exceeded, the user account associated with the node is classified as a malicious user account.

7. The method of claim 5, further comprising determining the reputation score for the node as a goodness score and a badness score, wherein the goodness score is based on a number of emails sent to the user account from other legitimate user accounts, and wherein the badness score is determined based on inverse edges in the directed graph.

8. The method of claim 5, wherein the degree-based detection is defined based on a threshold N, and wherein if the out-degree is less than or equal to N, then the user account is a legitimate user account.

9. The method of claim 8, wherein the friend-degree is analyzed based on if the out-degree is less than N for an inactive user, then the user account is considered a legitimate user account, and wherein if the out-degree is greater than N and the friend-degree is greater than a second threshold, K, then the user account is considered a legitimate user account.

10. The method of claim 1, further comprising applying a weight to at least one of the directed or undirected edges, wherein the weight represents the strength of social relationship between two accounts or represents the degree of communication between two accounts.

11. A system for classifying user accounts, comprising:

a cluster of computing devices, each computing device having a processor;

a memory communicatively coupled to the processor; and an account management framework that executes in the processor from the memory and that, when executed by the processor, causes the system to register a user account in a registration component, to perform a vouching process comprising using the receiving of one or more communications in the user account from an authoritative entity as an indicator of legitimacy, the vouching process validating the user account in accordance with a social graph associated with the user account at a vouching component, and to classify the user account into either a trusted component or a quarantine component based on whether the user account is a legitimate user account or a malicious user account, respectively.

12. The system of claim 11, wherein the one or more communications from the authoritative entity comprises an order confirmation.

13. The system of claim 11, wherein the vouching component determines if the user account has received emails from a predetermined number of legitimate user accounts before allowing the user account to send emails.

14. The system of claim 11, wherein the vouching component checks a connectivity among other user accounts that send emails to the user account, and wherein the vouching component checks a reputation of each of the other user accounts to determine if the user account is a legitimate user account.

15. The system of claim 11, wherein a user associated with the user account provides a list of email addresses, and wherein the vouching component determines from the list of email addresses whether the user associated with the user account is a legitimate user.

16. The system of claim 11, wherein the user account is put into the quarantine component to limit functionality of the user account.

17. The system of claim 11, wherein a reputation is determined in accordance with at least one of connectivity of the user account with other user accounts, a clustering coefficient of the user account, or a connectivity with a biggest connected component in the social graph.

18. The system of claim 17, wherein the user account is monitored over time to update the reputation associated with the user account.

19. The system of claim 17, wherein the reputation is based on a goodness score and a badness score.

20. An email system providing malicious user account detection, comprising:

an email server that processes email sent to and from uniquely identified user accounts, the email server maintaining information about processed email and the uniquely identified user accounts in a database; and a detection server that receives the information about the email from the email server and analyzes the information in accordance with a directed graph and an undirected graph constructed about the uniquely identified user accounts, wherein each node of the directed graph and the undirected graph is associated with each uniquely identified user account and each edge of the directed graph is determined by a direction of emails sent or received by the uniquely identified user account associated with each node, and wherein a degree-based detection and ranking detection is applied to each node of the directed graph to determine a reputation score of each node, the reputation score being propagated to other nodes and being used to classify each uniquely identified user account as a legitimate user account, a malicious user account, or a legitimate user account that has been compromised.

* * * * *